UNITED STATES PATENT OFFICE 2,343,860

SULPHUR PRODUCT AND METHOD OF PRODUCING SAME

Isaac Bencowitz, Newgulf, Tex., assignor to Texas Gulf Sulphur Company, Houston, Tex., a corporation of Texas No Drawing. Application November 7, 1940, Serial No. 364,692

12 Claims. (Cl. 252—313)

This invention relates to sulphur products and to a method of producing the same. The invention aims to provide a product containing sulphur, asphalt and an organic solvent for the asphalt in which the sulphur particles contain a film of dissolved asphalt. The product containing sulphur may be incorporated with an emulsifying agent and water to form an aqueous emulsion containing particles of sulphur in suspension. The aqueous sulphur suspension of the invention has many attributions of a true colloid or emulsion and will be referred to hereinafter, for convenience, as an emulsion.

As a result of my investigations, I have discovered that elemental sulphur may be dispersed in asphalt and a suitable organic solvent to coat particles of the sulphur with a film of dissolved asphalt and that sulphur-containing emulsions may be formed of such a product with an emulsifying agent and water. I have found that the sulphur can be brought into a colloidal aqueous suspension without involving the sulphur in intermediate chemical reactions. It appears that the asphalt and organic solvent have an affinity for the sulphur and, as a result, form a film around the particles of sulphur. This film emulsifies with water in the presence of an emulsifying agent. The foregoing explanation of the phenomenon which I have discovered is merely offered as a possible explanation of the behavoir of the materials and is not intended to affect the limitations of the invention. I have found that the emulsion may contain sulphur and water in varying amounts which may vary from those having the consistency of glycerine to a semi-fluid paste and the sulphur shows no tendency to settle even after standing several months.

The sulphur may be provided in any suitable pulverulent condition. Crude sulphur may be reduced to the necessary particle size by grinding it with asphalt or the asphalt and sulphur may be fused together to effect the necessary subdivision. While I have found that such organic solvents for asphalt as kerosene, naphtha, benzene, toluene, oils, etc., are quite satisfactory, the petroleum distillates such as kerosene and naphtha (86 Bé.) are especially effective.

The method of the invention comprises various operations or steps leading to, or resulting in, the preparation of a sulphur-containing emulsion. As a preliminary part of my method I form a product from sulphur, asphalt and a solvent for the asphalt in which the sulphur is in the form of fine particles coated with dissolved asphalt. I have found two especially effective means of accomplishing this, one of which involves mixing the sulphur, asphalt and solvent together as in a grinding or stirring operation, and the other involves fusing the sulphur and asphalt together and extracting the excess asphalt leaving a sulphur product containing fine particles coated with asphalt. This more or less homogeneous product of sulphur, asphalt and solvent is in an especially effective form to produce the aqueous emulsion and will be referred to hereinafter as the basic mixture. In using the basic mixture to produce the sulphur-containing emulsion, I incorporate an emulsifying agent such as a fatty alcohol sulphate in the mixture and it is then in a desirable condition to receive the water for forming the emulsion. The water may be used in any amount necessary to produce an emulsion of the required physical consistency or fluidity.

In preparing a sulphur-containing product of the invention, the basic mixture of sulphur, asphalt and solvent such as kerosene, or the like, may be prepared, for example, by grinding crude sulphur and asphalt in the presence of the solvent. If sulphur in a sufficiently fine state of division is available the grinding is unnecessary and the mixture may be prepared by stirring the sulphur into a solution of solvent and asphalt. A suitable basic mixture may be prepared by using about two pounds (907 grams) of sulphur, 350 cc. of kerosene and from 35 to 500 grams of asphalt. The resulting mixture is in a stable condition and may be stored for relatively long periods of time. The basic mixture is particularly suitable for a subsequent and relatively simple conversion into an aqueous sulphur-containing emulsion. In forming the emulsion, the basic mixture is preferably further thinned by the addition thereto of a relatively large quantity of kerosene, for example, about 450 cc. The basic mixture formed in this way should preferably contain not less than about 700 cc. of kerosene to 907 grams of sulphur. Any suitable emulsifying agent may be incorporated in the mixture and I have found that a fatty alcohol sulphate, for example, a product manufactured by Procter and Gamble and marketed as "Modinal," is especially effective for this purpose. If an aqueous emulsion containing a relatively large amount of water, a relatively small sulphur concentration, and with relatively low viscosity is desired, then the amount of kersoene incorporated in the basic mixtures should be increased. On the basis of the aforementioned quantities of sulphur and asphalt, the kerosene may be increased to around 4000 cc. This material is in the form of a sulphur paste and is ready for conversion into an emulsion merely by the addition thereto of the required amount of water.

The basic mixture together with the required amount of solvent, an emulsifying agent and with or without a small amount of water all mixed together as just described may be prepared as an intermediate product. The sulphur paste is in desirable form for storage and shipping. In forming an emulsion, the sulphur paste is diluted with any suitable amount of water, for example, about 145 cc. of water to 20 grams of the sulphur paste. As more and more water is added, the emulsion takes on a jelly-like structure of decreasing fluidity.

A sulphur paste containing sulphur 907 grams, asphalt 87 grams, kerosene 800 cc., and an emulsifying agent 86 grams may be used to form emulsions as follows: By the addition of a suitable amount of water to the sulphur paste with accompanying stirring, an emulsion may be formed containing, for example, 6.3% sulphur, 5.5% kerosene, 0.6% asphalt, 0.6% emulsifying agent, and 87% water. An emulsion of the foregoing consistency may be further diluted with water forming a slightly less stable emulsion having the following composition: 4.4% sulphur, 4.1% kerosene, 0.45% asphalt, 0.45% emulsifying agent, and 90.3% water. An emulsion of the latter consistency contains approximately the maximum water dilution for the amounts of kerosene and sulphur used. If, however, the original sulphur paste contains a larger proportion of kerosene, for example, 1200 cc. instead of 800 cc. per 907 grams of sulphur, then it is possible to use more water forming an emulsion with a lower sulphur concentration and with a much lower viscosity. Such an emulsion may contain at its highest effective aqueous dilution 3.5% sulphur, 5.2% kerosene, 0.2% asphalt, 0.2% emulsifying agent, and 90.9% water. By further increasing the kerosene content of the sulphur base, it is possible to form an emulsion having an even greater water dilution. Thus, for example, stable emulsions may be made containing 1.5% sulphur, 4.2% kerosene, 0.1% asphalt, 0.1% emulsifying agent, and 94.1% water. As a result of my investigations, I have discovered that when the kerosene content is increased, the sulphur content may be decreased and that the water content may also be increased. The viscosity of emulsions with higher kerosene content is lower even for the same water and sulphur content. By suitably proportioning the components, a concentrated emulsion can be made containing 40% sulphur, 12% asphalt, 12% kerosene, 3% emulsifying agent, and 33% water.

I have found the following method of forming the basic mixture of sulphur, asphalt and kerosene to be highly efficient and in some respects more advantageous than the method previously described. It not only eliminates the grinding of the sulphur where the sulphur is not in an initial fine state of sub-division but very effectively causes the particles of sulphur to be coated with a film of asphalt and solvent. The mixture may be formed more or less continuously by stirring together molten sulphur and asphalt at a temperature of from 120° to 150° C. for from 1½ to 2½ hours. The sulphur asphalt mixture may contain 40% sulphur and 60% asphalt but it is desirable to use a higher percentage of sulphur, for example, 60 to 65%, because in the subsequent extraction operation the sulphur will settle more effectively if used in the higher percentages. In order to dissolve this mixture in solvent, I have found it advantageous to pour the molten mixture of sulphur and asphalt into sheets of from ¼ to ½ of an inch in thickness. After the sheets have solidified, they are broken into pieces and dissolved and/or suspended in a suitable solvent, for example, in kerosene. This may be done in any suitable manner as, for example, by stirring the pieces and kerosene together in an extraction container. The extraction can be carried out at room temperature or at higher temperatures, but not above 112° C. The kerosene dissolves and suspends the asphalt and is run into a still in which the kerosene is distilled off and returned to the extraction container. Instead of distilling the solvent off, the asphalt may be allowed to settle out from the kerosene. The asphalt left as a residue in the still is returned to the process to be used in forming the molten mixture of sulphur and sphalt. The sulphur settles out in the extraction vessel. The operation should be so controlled that the sulphur which settles in the extraction vessel does not contain less than about 3% of asphalt. The amount of solvent in the kerosene used for extraction is determined not so much by the solubility, as by the viscosity of the solution. The sulphur will not settle out readily if the kerosene-asphalt solution is too viscous. I have found that by using the proportions of 900 to 1000 cc. of kerosene to one pound of asphalt the extraction can be carried out satisfactorily.

The sulphur removed from the extraction vessel is coated with a film of asphalt and solvent and is in a particularly desirable state to form either the basic mixture by the mere addition thereto of the desired quantity of kerosene, or to be formed directly into sulphur paste by the incorporation therewith of the required quantity of kerosene and an emulsifying agent.

Instead of forming an emulsion of the consistency desirable for a particular use, the sulphur paste may be mixed with an emulsifying agent and only a sufficient amount of water added to form a semi-fluid paste. This semi-fluid sulphur paste, as has previously been described, may be stored for considerable periods and is in a particularly desirable form for shipping. At the place of use, the required amount of water may be stirred into the sulphur paste to form an aqueous emulsion of the desired consistency. Aqueous sulphur-containing emulsions may be formed of the sulphur paste by using such quantities of solvent and water as to form emulsions having the compositions previously described.

I have found that small quantities of acid stabilize the aqueous sulphur-containing emulsion. I have found that the following acids, oxalic, lactic, phosphoric, picric, citric, gallic, and acetic, which are listed in the order of their decreasing effectiveness when added to the emulsions in amounts of about 1 cc. of a 10% solution to 150 cc. of the emulsion, considerably stabilize the emulsion.

Various types of asphalts which I have found satisfactory include Mexican, Texas, Venezuelan, Mid-Continent and Gulf Coast both air and steam blown. There is nothing particularly critical about the asphalt and I may use asphalt having various softening point and penetration characteristics.

The aqueous sulphur-containing emulsions of the invention may be used as an insecticide or as a fungicide. It may be used to spray animals and as a pharmaceutical preparation. It has many industrial uses such as a lubricant, an intermediary in various manufacturing processes, and as a mud in oil well drilling operations.

I claim:

1. A product suitable for forming an aqueous sulphur-containing emulsion comprising finely divided sulphur the particles of which are coated with a film of asphalt and a solvent of petroleum origin for the asphalt, and an emulsifying agent in the product.

2. A product suitable for forming an aqueous sulphur-containing emulsion comprising fine particles of sulphur coated with a film of asphalt and an organic solvent for the asphalt, and an emulsifying agent in the product.

3. A semi-fluid paste comprising a mixture of fine particles of sulphur coated with a film of asphalt and kerosene, and an emulsifying agent and a relatively small quantity of water in the paste.

4. An aqueous emulsion containing elemental sulphur comprising relatively small quantities of sulphur coated with a film of asphalt and kerosene, an emulsifying agent, and a relatively large quantity of water.

5. An aqueous emulsion containing elemental sulphur comprising from about 3.5% to 6.3% sulphur, about 5% of kerosene, less than 0.6% asphalt, less than 0.6% emulsifying agent and at least 87% water, said kerosene and asphalt forming a solution which coats the particles of sulfur with a film.

6. The method of producing a sulphur product suitable for forming an emulsion with water which comprises fusing a mixture of sulphur and asphalt, dissolving and separating from the sulphur a major portion of the asphalt leaving a residue comprising particles of sulphur coated with a film of asphalt.

7. The method of producing a sulphur product suitable for forming an emulsion with water which comprises fusing a mixture of sulphur and asphalt, dissolving and separating from the sulphur a major portion of the asphalt leaving a residue comprising particles of sulphur coated with a film of asphalt, and incorporating a sufficient quantity of an emulsifying agent and water with the sulphur to form a semi-fluid paste.

8. The method of producing a sulphur product suitable for forming an emulsion with water which comprises fusing a mixture of sulphur and asphalt, dissolving and separating from the sulphur a major portion of the asphalt leaving a residue comprising particles of sulphur coated with a film of asphalt, and mixing with the sulphur a solvent for the asphalt of petroleum origin, a small quantity of an emulsifying agent and a small quantity of water to form a semi-fluid paste.

9. The method of producing a sulphur product suitable for forming an emulsion with water which comprises mixing fine particles of sulphur, asphalt and an organic solvent for the asphalt which is a petroleum distillate to form a homogeneous product in which the particles of sulphur are coated with a film of asphalt and solvent, and incorporating a relatively small quantity of emulsifying agent with the sulphur.

10. The method of producing a sulphur product suitable for forming an emulsion with water which comprises mixing fine particles of sulphur, asphalt and an organic solvent for the asphalt which is a petroleum distillate to form a homogeneous product in which the particles of sulphur are coated with a film of asphalt and solvent, and incorporating a relatively small quantity of an emulsifying agent and water with the sulphur.

11. The method of forming an aqueous sulphur-containing emulsion which comprises coating particles of sulphur with a film of asphalt dissolved in an organic solvent, and mixing an emulsifying agent and water with the coated particles of sulphur, the organic solvent comprising not more than about 5% of the emulsion by weight.

12. The method according to claim 11 in which the organic solvent contains kerosene and the water exceeds 85% of the emulsion by weight.

ISAAC BENCOWITZ.